(12) United States Patent
Brogan et al.

(10) Patent No.: US 9,270,194 B2
(45) Date of Patent: Feb. 23, 2016

(54) CONTROLLER FOR CONTROLLING A POWER CONVERTER

(71) Applicants: Paul Brian Brogan, Glasgow (GB); Rodney Jones, Stoke on Trent (GB)

(72) Inventors: Paul Brian Brogan, Glasgow (GB); Rodney Jones, Stoke on Trent (GB)

(73) Assignee: Siemens Aktiengesellschaft, Munich (DE)

( * ) Notice: Subject to any disclaimer, the term of this patent is extended or adjusted under 35 U.S.C. 154(b) by 160 days.

(21) Appl. No.: 14/214,763

(22) Filed: Mar. 15, 2014

(65) Prior Publication Data
US 2014/0307488 A1  Oct. 16, 2014

(30) Foreign Application Priority Data

Apr. 16, 2013  (EP) .................................. 13163920

(51) Int. Cl.
| | |
|---|---|
| H02P 11/00 | (2006.01) |
| H02H 7/06 | (2006.01) |
| H02P 9/00 | (2006.01) |
| H02M 5/458 | (2006.01) |
| H02J 3/38 | (2006.01) |
| H02P 9/02 | (2006.01) |
| F03B 13/00 | (2006.01) |
| F03B 13/10 | (2006.01) |

(52) U.S. Cl.
CPC ............. *H02M 5/4585* (2013.01); *H02J 3/382* (2013.01); *H02P 9/02* (2013.01)

(58) Field of Classification Search
USPC ............................ 322/32; 290/43, 44; 363/47
See application file for complete search history.

(56) References Cited

U.S. PATENT DOCUMENTS

| | | | | |
|---|---|---|---|---|
| 5,349,284 A | * | 9/1994 | Whittle ............... | H02M 1/4225 323/207 |
| 5,751,120 A | * | 5/1998 | Zeitler ............... | H05B 41/2853 315/225 |
| 5,771,162 A | * | 6/1998 | Kwon ................... | H02H 7/122 363/21.18 |
| 7,372,174 B2 | * | 5/2008 | Jones ..................... | H02P 9/102 290/43 |
| 7,511,385 B2 | * | 3/2009 | Jones ................. | H02M 5/4585 290/43 |

(Continued)

OTHER PUBLICATIONS

Xiongfei Wang et al; "Control of Grid Interactive AC Microgrids"; IEEE International Symposium on Industrial Electronics, Piscataway, NJ; pp. 2211-2216; ISBN: 978-1-4244-6390-9; DOI: 10.1109/ISIE.2010.5637807; XP031803400; 2010; Jul. 4, 2010.

(Continued)

*Primary Examiner* — Pedro J Cuevas
(74) *Attorney, Agent, or Firm* — Beusse Wolter Sanks & Maire

(57) ABSTRACT

A controller is provided for controlling a power converter that converts electrical input power of a wind turbine into electrical output power provided to a grid. The power converter includes grid-side and turbine-side converter parts. The controller comprises an input terminal for receiving a voltage reference signal associated with a predefined grid voltage and a frequency reference signal associated with a predefined grid frequency, and a network bridge controller adapted to control power conversion of the grid-side converter part. The network bridge controller includes a modulator for modulating gate drive command signals in the grid-side converter part based on a reference voltage and a reference angle derived from the voltage reference signal and the frequency reference signal. The modulator is adapted to modulate the gate drive command signals to maintain the predefined grid voltage and the predefined grid frequency in the power converter in case of failure within the grid.

16 Claims, 9 Drawing Sheets

(56) References Cited

U.S. PATENT DOCUMENTS

| | | | | | |
|---|---|---|---|---|---|
| 7,656,052 | B2* | 2/2010 | Jones | H02M 5/4585 | 290/43 |
| 7,692,321 | B2* | 4/2010 | Jones | H02M 5/4585 | 290/43 |
| 7,755,209 | B2* | 7/2010 | Jones | H02M 5/4585 | 290/44 |
| 8,008,885 | B2* | 8/2011 | Jones | B63H 21/17 | 318/800 |
| 8,050,067 | B2* | 11/2011 | Fulcher | H02J 3/38 | 363/72 |
| 8,097,971 | B2* | 1/2012 | Ichinose | F03D 9/003 | 290/44 |
| 8,198,742 | B2* | 6/2012 | Jorgensen | F03D 7/0224 | 290/44 |
| 8,513,911 | B2* | 8/2013 | Jones | B63H 21/17 | 290/43 |
| 8,558,405 | B2* | 10/2013 | Brogan | H02J 3/386 | 290/55 |
| 8,680,701 | B2* | 3/2014 | Jones | H02M 1/32 | 290/44 |
| 8,890,454 | B2* | 11/2014 | De Franciscis | H02P 9/10 | 318/400.01 |
| 2005/0122083 | A1 | 6/2005 | Erdman et al. | | 322/20 |
| 2007/0108771 | A1* | 5/2007 | Jones | H02P 9/102 | 290/44 |
| 2007/0121354 | A1* | 5/2007 | Jones | H02M 5/4585 | 363/47 |
| 2008/0284369 | A1* | 11/2008 | Jones | B63H 21/17 | 318/722 |
| 2009/0079193 | A1* | 3/2009 | Nielsen | F03D 7/0272 | 290/44 |
| 2009/0146426 | A1* | 6/2009 | Jones | H02M 5/4585 | 290/44 |
| 2009/0146500 | A1* | 6/2009 | Jones | H02M 5/4585 | 307/82 |
| 2009/0147549 | A1* | 6/2009 | Jones | H02M 5/4585 | 363/37 |
| 2009/0206606 | A1* | 8/2009 | Jorgensen | F03D 7/0224 | 290/44 |
| 2009/0278354 | A1* | 11/2009 | Ichinose | F03D 9/003 | 290/44 |
| 2011/0170323 | A1* | 7/2011 | Fulcher | H02J 3/38 | 363/65 |
| 2012/0032617 | A1* | 2/2012 | Jones | B63H 21/17 | 318/51 |
| 2012/0147634 | A1* | 6/2012 | Jones | H02M 1/32 | 363/37 |
| 2012/0206945 | A1* | 8/2012 | Brogan | H02M 1/12 | 363/40 |
| 2012/0299305 | A1* | 11/2012 | Brogan | H02J 3/386 | 290/55 |
| 2013/0049660 | A1* | 2/2013 | De Franciscis | H02P 9/10 | 318/400.23 |
| 2013/0200617 | A1* | 8/2013 | Smith | H02P 9/02 | 290/43 |
| 2015/0084337 | A1* | 3/2015 | Wagoner | H02P 9/007 | 290/44 |

OTHER PUBLICATIONS

Hu Y. et al; "Voltage Source Converters in Distributed Generation Systems"; Electric Utility Deregulation and Restructuring and Power Technologies, Third International Conference IEEE, Piscataway, NJ; pp. 2775-2780; ISBN: 978-7-900714-13-8; XP031254330; 2008; Apr. 6, 2008.

Erlich I. et al; "Interaction of Large Offshore Wind Parks with the Electrical Grid"; Electric Utility Deregulation and Restructuring and Power Technologies, Third International Conference, IEEE, Piscataway, NJ; pp. 2658-2663; ISBN: 978-7-900714-13-8; XP031254308; 2008; Apr. 6, 2008.

* cited by examiner

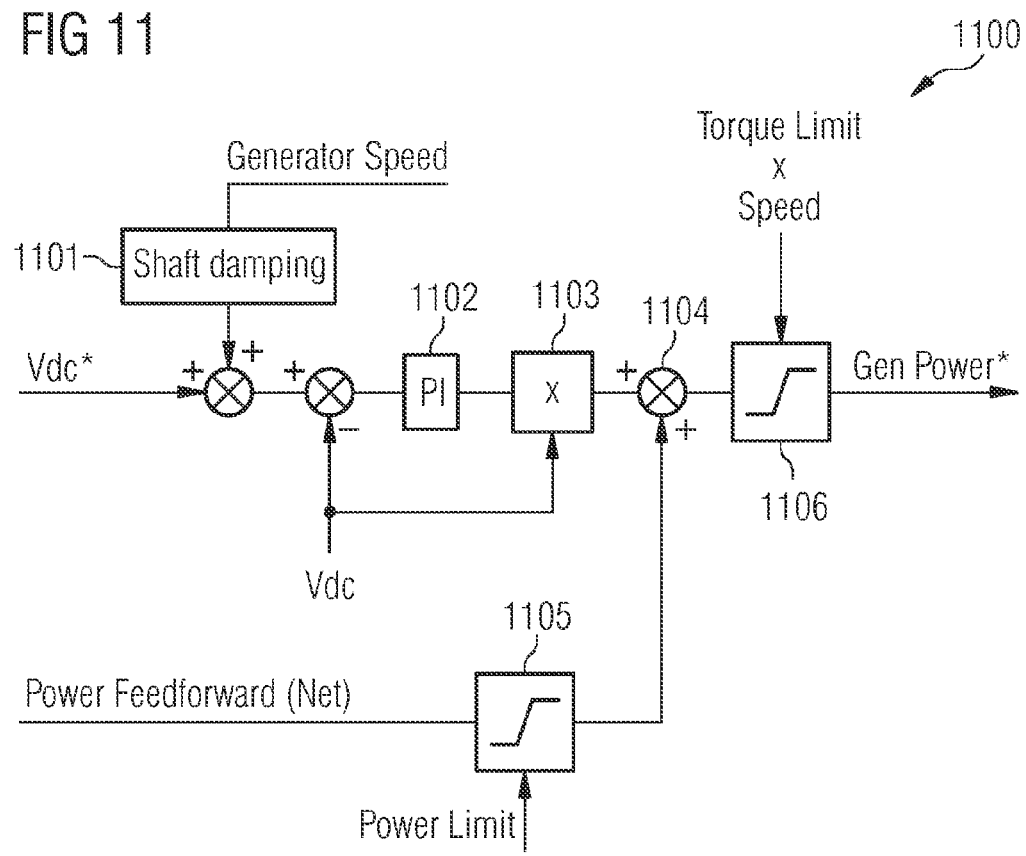

CONTROLLER FOR CONTROLLING A POWER CONVERTER

CROSS REFERENCE TO RELATED APPLICATIONS

This application claims the benefit of European Application No. EP13163920 filed Apr. 16, 2013, incorporated by reference herein in its entirety.

FIELD OF INVENTION

The present invention relates in general to the control of a power converter in events of an islanded (disconnected) part of a utility grid. In particular, the present invention relates to a controller for controlling a power converter for a wind turbine for maintaining the grid voltage and frequency in the islanded part of the grid in the case of a failure in the grid, for instance an islanded part of the grid. Furthermore, the present invention relates to a power generation system including the power converter and the controller. Moreover, the present invention relates to a method for controlling the conversion of power within a power converter. Beyond this, the present invention relates to a computer program for controlling the conversion of power within a power converter.

ART BACKGROUND

One or more power generation systems, such as wind turbines, may be connected to a utility grid to supply electric energy to the utility grid. The power provided by the wind turbine generator and the power needed by the utility grid may have different frequencies, in particular electrical frequencies. In a wind turbine, a frequency converter is used to interface the AC (alternating current) power from the generator to the AC power of the utility grid.

There may be a situation where a wind farm is producing power into the electrical system, i.e., the utility grid, and part of this electrical system becomes islanded, i.e., disconnected from the rest of the grid. There may be also a situation where a wind farm is producing power into one end (the non grid connected end) of an HVDC scheme, and either the electrical system becomes islanded, or the HVDC scheme blocks, meaning the switching devices within the remote HVDC power converter terminal are turned off.

In the case of an islanded electrical system, a wind farm may be producing power into the electrical system and the part of this electrical system to which the wind farm is connected may become islanded, with undefined local loads, and undefined local generation on the Islanded system.

In the event of an islanded electrical system, a common vector current controller algorithm will 'track' the frequency and voltage of the islanded system and unless the load and generation are perfectly balanced, the islanded system frequency will deviate from 'nominal' and eventually deviate by a sufficient degree that the power converter (and/or other turbine or electrical system components) trip or shut down. A common network bridge current controller does nothing to actually help maintain 'nominal' voltage or frequency, it does not act in the same manner as a synchronous generator.

Thus, there may be a need for a controller being adapted to be controlled during conditions when a power converter (within for example a wind turbine) should be controllable in such a manner to specifically support or maintain the nominal voltage and frequency on an islanded system.

SUMMARY OF THE INVENTION

This need may be met by the subject matter according to the independent claims. Advantageous embodiments of the present invention are described by the dependent claims.

According to an aspect of the invention, a controller for controlling a power converter for a wind turbine is provided, the power converter for converting an electrical input power of the wind turbine into an electrical output power, wherein the electrical output power is provided to a grid, wherein the power converter comprises a grid-side converter part and a generator-side converter part. The controller comprises an input terminal for receiving a voltage reference signal being associated with a predefined grid voltage and a frequency reference signal being associated with a predefined grid frequency, and a network bridge controller being adapted to control the power conversion of the grid-side converter part, wherein the network bridge controller comprises a modulator for modulating gate drive command signals in the grid-side converter part based on a reference voltage and a reference angle being derived from the voltage reference signal and the frequency reference signal, wherein the modulator is adapted to modulate the gate drive command signals in order to maintain the predefined grid voltage and the predefined grid frequency in the power converter in the case of a failure within the utility grid.

A failure within the utility grid may be a disconnection of a part of the utility grid, i.e., an islanded part, to which part the wind turbine is delivering power or a complete islanded utility grid.

The wind turbine may comprise a tower, a nacelle mounted on top of the tower, and a rotor rotatably supported within the shaft, wherein at the rotor one or more rotor blades are mounted. The rotor shaft may mechanically be coupled to the generator for generating electric energy when the rotor shaft rotates due to wind impacting on the rotor blades.

The power converter may be a fixed switching frequency 2 level power converter. The controller may also be used in combination with multi-level power converters, variable switching frequency hysteresis or sliding mode control schemes.

In particular, the generator of the wind turbine may generate variable frequency AC power (or an AC power stream) which may be supplied to the frequency converter, which may be a full-scale converter. AC power in this context may refer to current or voltage with a specific frequency. The frequency converter may first convert the variable frequency AC power to a DC power and may then convert the DC power to a fixed frequency AC power having the frequency of the utility grid under normal conditions, i.e. the nominal grid frequency.

The term "utility grid" may denote a grid to which the power generation system supplies energy and from which one or more consumers extract electrical energy.

The term "nominal voltage" may denote the system design voltage. The term "prevailing voltage" may denote the voltage at which the turbine is presently working at, and this may change during the course of a day due to power, reactive power requirements, connected power factor correction capacitors or equipment, or other voltage controlling means, transformers tap changers, HVDC schemes, Static Var Compensators, or the like.

The term "voltage reference" may denote the desired LV busbar voltage within the turbine, and may be sent from the wind park controller in order that the predefined (for instance required) voltage (or reactive power) is achieved at the terminals of the wind park, which is usually the HV side of the wind park transformer. It is normal for this voltage reference to deviate from the "nominal voltage".

According to this aspect of the invention, a scheme is provided whereby a wind turbine converter can act to mimic a synchronous generator, by acting to help support or maintain the nominal voltage and frequency on an islanded system. By using the described controller, rather than control the current directly, the network bridge is given a modulation depth (voltage) reference and frequency reference. These voltage and frequency references are at nominal values (as an example, 690V and 50 Hz or 60 Hz may be assumed).

Traditional vector current control resolves the three phase currents into a D and Q axis component within the synchronously rotating reference frame. In the steady state, these D and Q axis components of current are DC quantities and therefore proportional integral (PI) controllers can be used to achieve zero steady state error. Extension of this includes negative sequence current controls, but the principle of both is that the voltage is controlled to achieve zero steady state current error. However, the synchronizing signal from which the DQ axis components of the current and voltages are derived is obtained from the prevailing voltage, and hence such scheme are inherently following the grid voltage and frequency.

According to the controller of the present invention, the objective of the network bridge may be to be a fixed voltage and frequency source up until the turbine limits are reached. Turbine limits in this context may refer to the maximum providable power, or the current, and/or voltage, rating of the power converter or turbine components, for instance. The network bridge may be synchronized with the prevailing grid conditions under normal steady state conditions and may attempt to maintain a nominal voltage and nominal frequency until such times as the current rating of the converter or turbine electrical system is reached, or the available power from the turbine is reached. At this point, the voltage and frequency reference to the network bridge may be modified to respect the current rating of the converter and turbine prevailing power capability. The principle here may be that the network bridge modulator receives a modulation depth and angle reference which are derived directly from references into the turbine (from example the wind park controller). The vector current controller might not define the modulation depth and angle, as it is the case in common power converters used within wind turbines.

When the rating of the turbines of the islanded system is exceeded, the voltage and/or frequency may be reduced to limit the load. It should be noted that the wind farm controller cannot limit the load in any way.

According to an embodiment of the invention, the grid-side converter part is synchronized with prevailing grid conditions based on the predefined grid voltage and the predefined grid frequency.

The network bridge, i.e., the grid-side or network side converter part, may be synchronized with the prevailing grid conditions under normal steady state conditions. Thus, the network bridge modulator may receive a modulation depth and angle reference which are derived directly from references into the turbine, from example the wind park controller, instead of references of the vector current controller.

According to an embodiment of the invention, the predefined grid voltage and/or predefined grid frequency are a desired and/or required grid voltage and/or grid frequency.

The voltage or frequency being required or desired may be for instance defined by a central control like the wind park controller or may be defined by the grid requirements.

According to an embodiment of the invention, the controller is further adapted to receive a wind turbine power signal being representative for the available power from the wind turbine, and wherein the network bridge controller is adapted to modulate the gate drive command signals based on the wind turbine power signal.

The controller, e.g., the network bridge controller, may attempt to maintain a nominal voltage and nominal frequency until such times as the current rating of the converter or turbine electrical system is reached, or the available power from the turbine is reached. Thus, the network bridge controller may modulate the gate drive command signals based on the wind turbine power signal.

According to an embodiment of the invention, the network bridge controller is adapted to adjust the reference voltage and reference angle based on the wind turbine power signal.

When the current rating of the converter or turbine electrical system is reached, or the available power from the turbine is reached, the voltage and frequency reference to the network bridge may be modified to respect the current rating of the converter and turbine prevailing power capability. Thus, the controller may consider actual wind conditions.

According to an embodiment of the invention, the controller is further adapted to receive a current rating signal being representative for the current rating from the wind turbine and/or power converter, and wherein the network bridge controller is adapted to modulate the gate drive command signals based on the current rating signal.

As described above, the gate drive command signals may be modulated by considering the current rating signal.

According to an embodiment of the invention, the network bridge controller is adapted to adjust the reference voltage and reference angle based on the current rating signal.

The voltage and frequency reference to the network bridge may be modified to respect the current rating of the converter. Thus, the reference signals may be adjusted in view of actual wind power and ratings of the converter.

According to an embodiment of the invention, the voltage reference signal and the frequency reference signal are received from a wind park controller or an external source.

A wind park controller may have all necessary signals and may thus provide these signals to the controller. The signals could also be default to nominal references in the event such a communication is lost.

According to an embodiment of the invention, the controller further comprises a compensation unit being adapted to compensate harmonic distortions being provided to the utility grid.

For instance by using a feedback mechanism, harmonic distortion introduced to the islanded network by non-linear loads may be reduced. Such a mechanism may be based on multiple synchronous rotating reference frames to compensate for the harmonic voltage distortion.

The controller as described herein may be amended by different specific mechanisms which will be shown later in further detail.

According to an embodiment of the invention, the controller further comprises a resonance damping unit being adapted to reduce resonances of the utility grid.

For instance, electrical system resonances could be damped on the islanded electrical system. If the voltage feedback from a more remote bus is available or its frequency spectra calculated in real time then, then control of the harmonic (and/or inter-harmonic) voltages caused by local non-linear loads or resonances within the islanded system could be feedback to the Network bridge to modulate a PWM voltage containing the correct harmonic spectra to damp the not so local harmonic voltages.

According to an embodiment of the invention, the network bridge controller is further adapted for performing fast control of power.

This may be used for instance during an HVDC system converter block.

According to an embodiment of the invention, the controller further comprises a control unit being adapted to control the connected turbines to share the power and reactive power load on the islanded system.

According to this embodiment, the turbines may be controlled in such a manner that the turbines are able to share the power and reactive power load, when there is a failure (i.e., the system is islanded).

According to an embodiment of the invention, the controller further comprises a re-synchronisation unit being adapted to re-synchronise the turbines when the failure within the grid ends.

Such a re-synchronisation may be used when the grid voltage does return. After a failure is removed or eliminated, such a re-synchronisation may be needed in order to ensure proper functioning of the wind turbines and the remaining system.

According to a further embodiment, there is provided a power generation system, in particular a wind turbine system, in particular for supplying electrical power to a utility grid. The power generation system comprises a power supply unit, in particular a generator, a power converter for converting an input power signal from the power supply unit into an output power signal, and the controller for controlling the power converter as described above.

According to a further aspect of the invention, a method for controlling a power converter for a wind turbine is provided, the power converter for converting an electrical input power of the wind turbine into an electrical output power, wherein the electrical output power is provided to a grid, wherein the power converter comprises a grid-side converter part and a turbine-side converter part. The method comprises receiving a voltage reference signal being associated with a predefined grid voltage and a frequency reference signal being associated with a predefined grid frequency, and controlling the power conversion of the grid-side converter part by modulating gate drive command signals in the grid-side converter part based on a reference voltage and a reference angle being derived from the voltage reference signal and the frequency reference signal, and modulating the gate drive command signals in order to maintain the predefined grid voltage and the predefined grid frequency in the power converter in the case of a failure within the grid.

It should be noted that the references are a predefined (for instance desired) grid voltage magnitude and frequency, and the network power converter may attempt to achieve this up until the rating of the equipment is reached, at the point where the rating is reached, the magnitude of voltage can be modified as can the frequency reference such that the converter/turbine operates within its current, prevailing power, and thermal ratings.

According to a further aspect of the invention, there is provided a computer program for controlling a power converter for a wind turbine. The computer program, when being executed by a data processor, is adapted for controlling the method as described above.

As used herein, reference to a computer program is intended to be equivalent to a reference to a program element containing instructions for controlling a computer system to coordinate the performance of the above described method.

The computer program may be implemented as computer readable instruction code in any suitable programming language, such as, for example, JAVA, C++, and may be stored on a non-transitory computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

According to a further aspect of the invention there is provided a non-transitory computer-readable medium (for instance a CD, a DVD, a USB stick, a floppy disk or a hard disk), in which a computer program for controlling a power converter for a wind turbine is stored, which computer program, when being executed by a processor, is adapted to carry out or control a method for controlling a frequency converter.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

Embodiments of the present invention are now described with reference to the accompanying drawings to which the invention is not limited.

FIG. 11 illustrates a generator bridge control.

DETAILED DESCRIPTION

Figure 1:
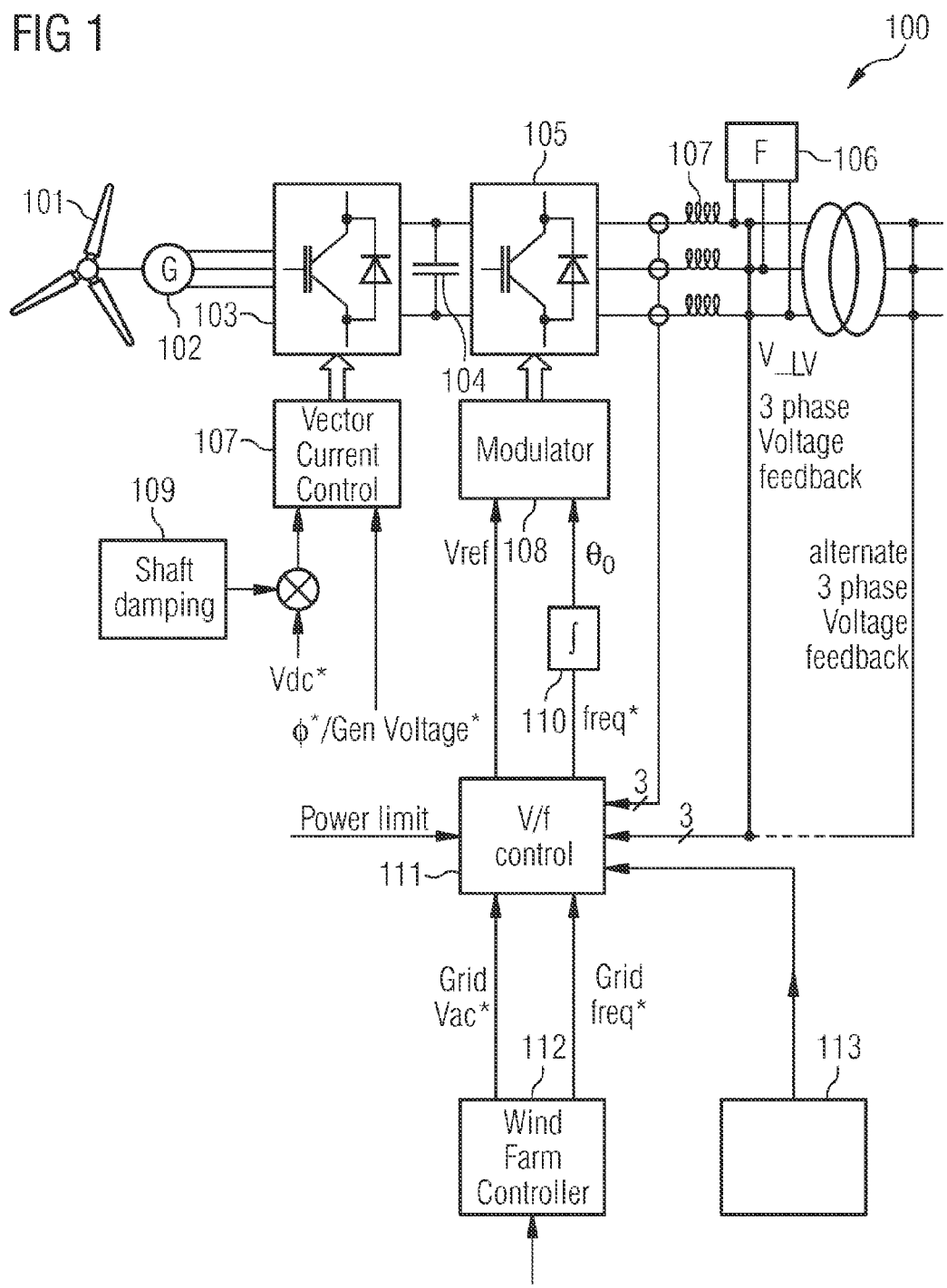
FIG. 1 illustrates a controller in a converter system according to an embodiment.

The illustration in the drawings is in schematic form. It is noted that in different figures, similar or identical elements are provided with the same reference signs.

As already explained above, traditional vector current control resolves the 3 phase currents into a D and Q axis component within the synchronously rotating reference frame. In the steady state, these D and Q axis components of current are DC quantities and therefore Proportional Integral (PI) controllers can be used to achieve zero steady state error. Extension of this includes negative sequence current controls, but the principle of both is that the voltage is controlled to achieve zero steady state current error. However, the synchronizing signal from which the DQ axis components of the current and voltages are derived is obtained from the prevailing voltage, and hence such schemes are inherently following the grid voltage and frequency.

Figure 2:
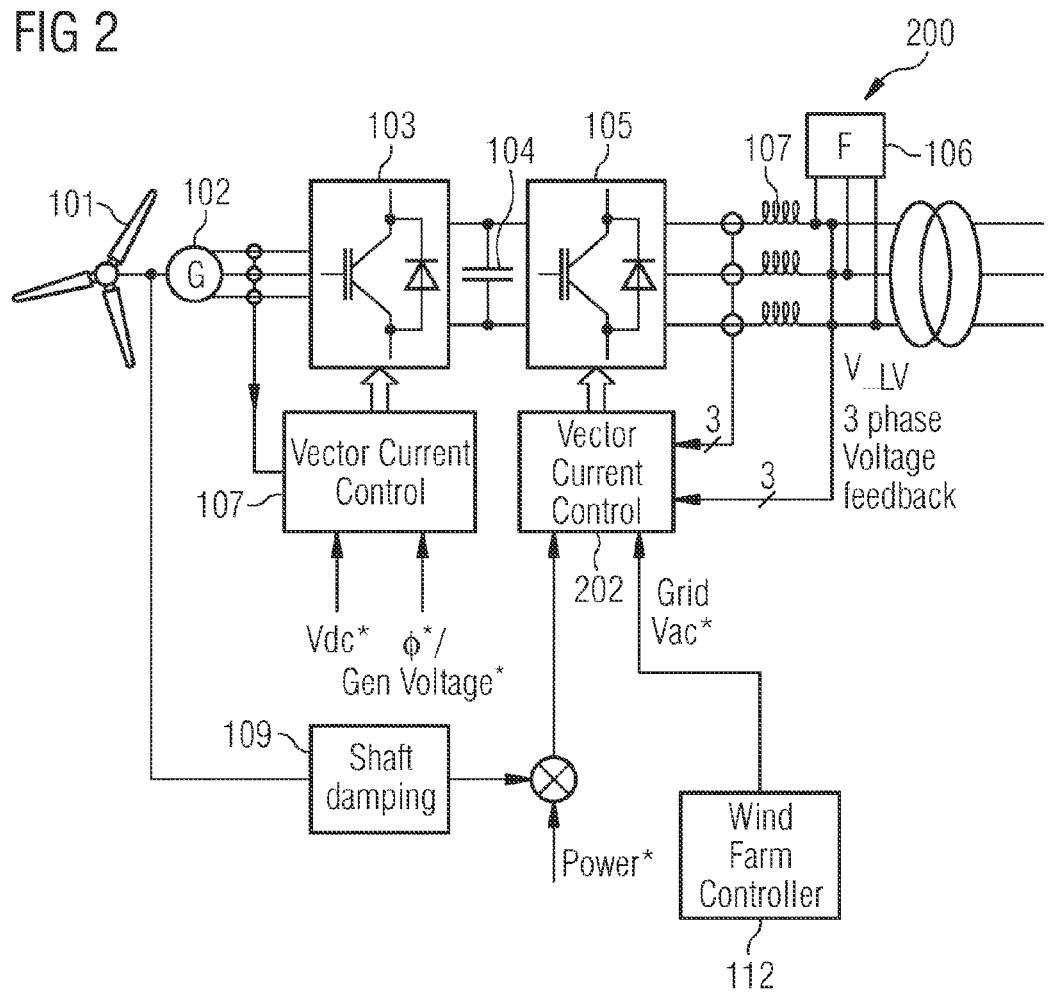
FIG. 2 illustrates a common converter system.

The system 200 of FIG. 2 shows which references are passed to the network (202) and generator (201) controllers controlling the frequency converter system 103, 104, 105, 106 and 107. The converter system receives an input power from a wind turbine 101 via a generator 102. The vector current controller(s) 201 and 202 control the frequency converter to export the power to the AC utility grid. This is a common control arrangement within the turbine. The converter part may comprise an optional PWM filter 106 (F). Further, a line reactor 107 may be arranged between the transformer and the network bridge.

FIG. 1 shows a system 100 according to the present invention. In this system, the objective of the network bridge is to be a fixed voltage and frequency source up until the turbine limits are reached. The network bridge is synchronized with the prevailing grid conditions under normal steady state conditions and attempts to maintain the busbar (to which the PWM filter 106) is connected (labelled V_LV) at reference voltage, GridVac* and reference frequency, GridFreq* until such times as the current rating of the converter or turbine electrical system is reached, or the available power from the turbine is reached, at this point the voltage and frequency reference to the network bridge are modified to respect the current rating of the converter and turbine prevailing power capability. The principle here being that the network bridge modulator 108 receives a modulation depth and angle reference from the network voltage frequency controller 111 (at least partially via an integrator 110) which are derived directly from references into the turbine from example the wind farm controller 112. An additional master time synchronization 113 signal may also be passed such that all turbines in an array can be synchronized. The modulation depth and angle are not defined by the vector current controller 107, as they are on the turbine shown in FIG. 2. The vector current receives an input signal derived from the shaft damping unit 109. The various sub features of such a system are explained in detail in the following. For instance, the network voltage frequency (V/f) controller 111 is shown in FIG. 3.

Using a power converter within a wind turbine to operate in such a manner may help maintain grid voltage and frequency on an islanded or faulted electrical system. As can be seen in the network voltage frequency control 300 of FIG. 3, the bridge voltage, or modulation depth control is derived from the GridVac* via a clamp based on the available D axis current and gain term K1 (320). The D axis current feedback is derived via synchronously rotating reference frame, and the 3 phase net bridge current feedback. The network bridge angle reference is derived from the Gridfreq*, clamped based on the available Iq via gain term K2 (321), and the frequency error passed via the PI controller. The available Iq is dependent on the rated current of the bridge, and the available power of the turbine, thus IqLimitA=sqrt(Irated^2−Id2) (309), and this is further clamped by a limit based on the prevailing available Power, IqLimitB=Plimit/(sqrt(3)*Vac) (307). It should be considered here whether the Vac or the freq get priority when in current limit, so some kind of 'priority' block could be added to the output of 321 and 320.

Figure 3:
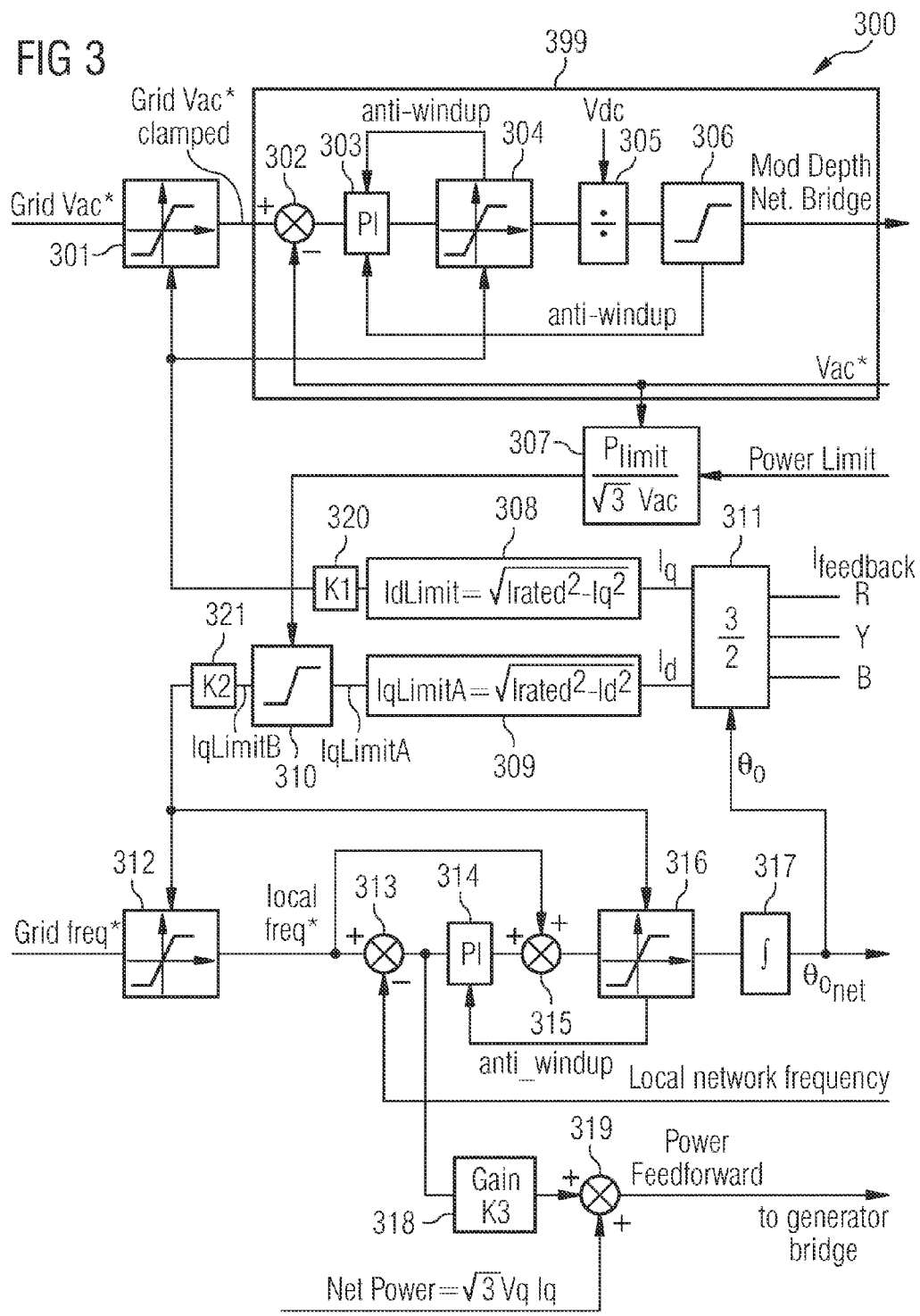
FIG. 3 illustrates a network voltage frequency control according to an embodiment.

As can be seen in FIG. 3, the GridVac* is processed via blocks 301, 302, 303, 304, 305 and 306 to get the modulation depth which is forwarded to the network bridge modulator. The output of the block 301 is based on the GridVac* and a current limit signal which is processed in block 308 and gain unit 320 to be forwarded to block 301. Blocks 311, 309, 310 and gain unit 321 are used in calculating the IqLimit which in turn influences the frequency of the network bridge. The grid freq* is processed in blocks 312, 313, 314, 315, 316 and 317 to a signal Q0net $\theta_0$. A power feedforward signal is generated by blocks 318 and 319 and forwarded to the generator bridge. Block 314 may be a proportional gain, or deadbanded proportional gain characteristic.

The purpose of the coupling to the generator bridge and the dual clamps based on Iq and Id respectively will be described later.

By permitting drive train damping and/or tower damping by energy exchange between the DC link and the generator, the need for the network bridge to be a controlled power source may be avoided. This may be achieved by modulating the Vdc reference on the generator bridge rather than modifying the power reference on the network bridge. This means that the generator bridge can be started and the mechanical shaft damped without the requirement for energy exchange with the external AC grid. Thus the network bridge can be started or run in 'voltage' source mode.

Figure 4:
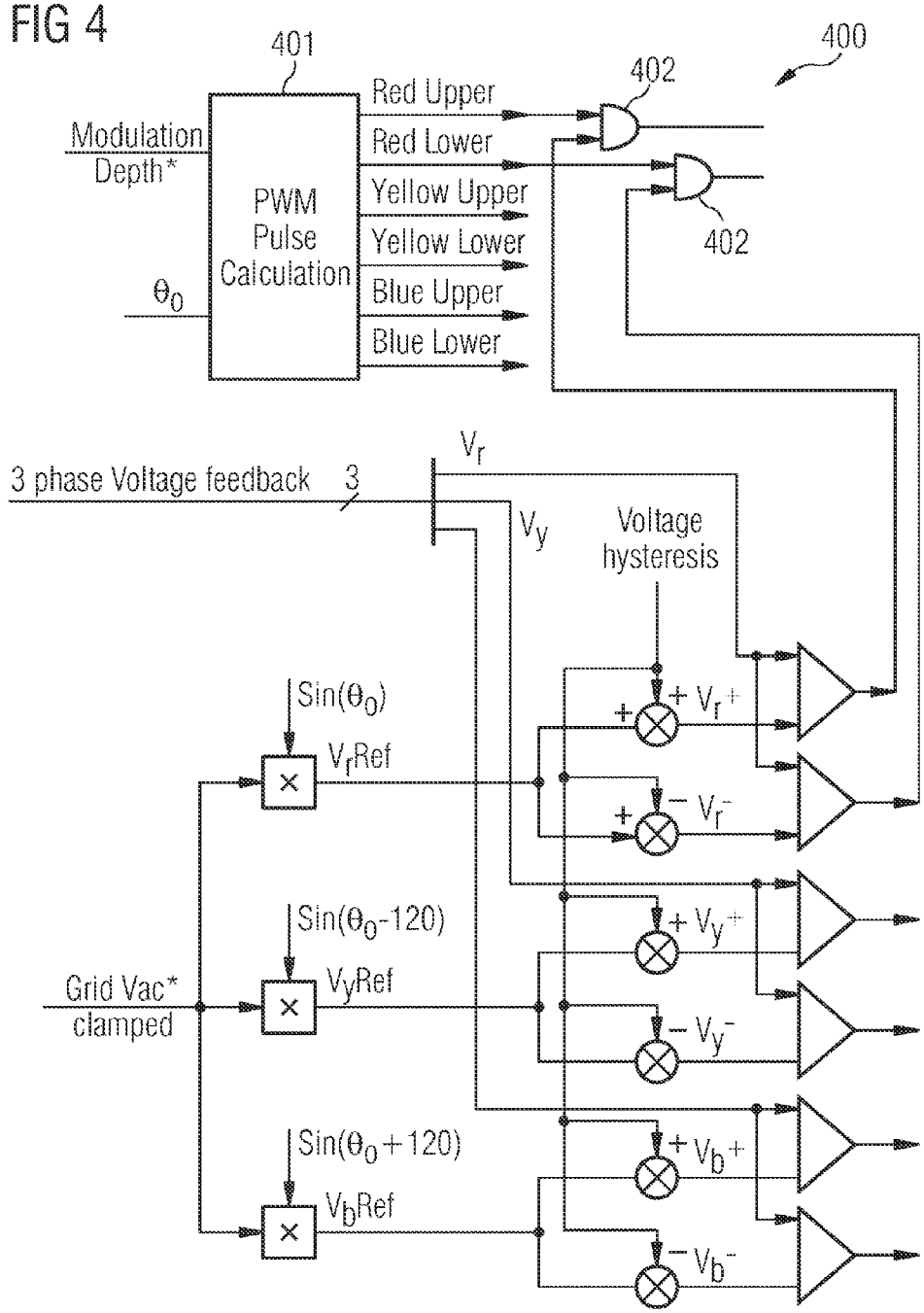
FIG. 4 illustrates a voltage brickwall according to an embodiment.

Defining a "voltage brickwall" 400 as shown in FIG. 4 may act as a fast method of limiting the voltage applied to the external electrical network, due to sudden changes in local reactive power consumption. The principle here is that the actual measured voltages of the busbar (V_LV) are compared to the GridVac*Clamped of FIG. 3, i.e., the output of 301), and if the voltage is too high (defining a hysteresis band) then the phase upper PWM pulse is blocked, or if the voltage is too low (−ve half cycle) then the lower phase PWM pulse is blocked. This can be considered as a set of tramlines around the reference voltage. The blocking signals into the AND gates 402, are the result of the comparison between the 3 phase voltage feedback and GridVac*Clamped (blocks 403, 404, 405, 406).

The steps as shown in FIG. 4 are replicated for all 3 phases. The actual voltage measured could be the LV or HV side of the turbine transformer, shown in FIG. 2. This "Voltage Brickwall" is intended to be a fast control of the network bridge voltage. The PI controllers 303,314 are intended to regulate the fundamental frequency and voltage of the MV or LV side of the turbine transformer on a longer timescale than the 'Voltage Brickwall' feature.

Equally the sinusoidal voltage brickwall could be replaced by a fixed upper and lower voltage threshold, whereby the PWM pulses are only blocked if the voltage exceed a fixed threshold, rather than a sinusoidal threshold. In addition to this a PWM modulation scheme could be considered whereby if the voltage in the upper ½ cycle is too low then an upper PWM pulse is turned on to increase the voltage, this is in effect a hysteresis, or sliding Mode type of control.

Figure 5:
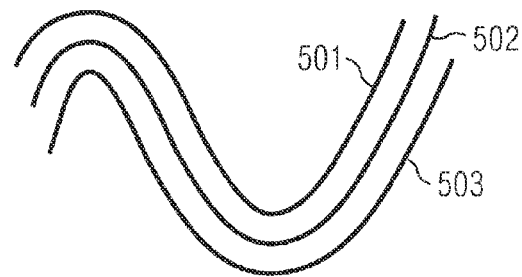
FIG. 5 illustrates a graph of the voltages of FIG. 4.

The sinusoidal signals of Vr+ (501), Vr− (503) and Vr (502) are shown in FIG. 5. Thus, FIG. 5 refers the hysteresis band shown in FIG. 4.

Figure 6:
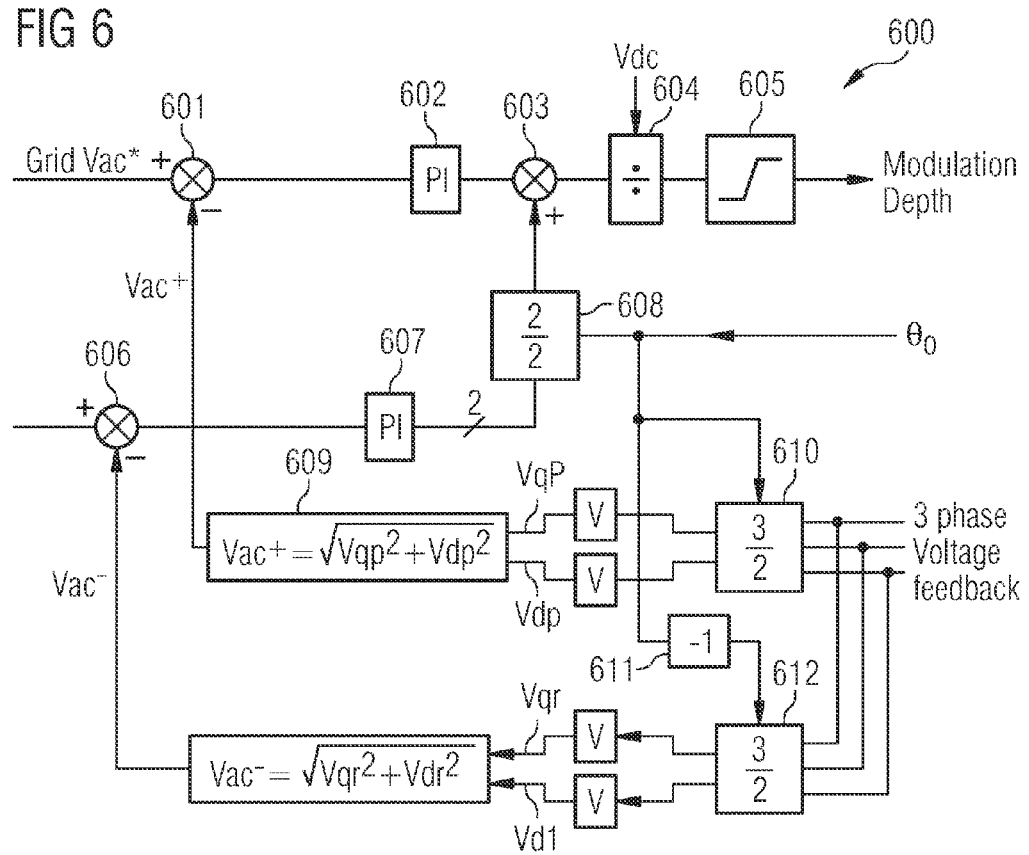
FIG. 6 illustrates an unbalance regulation according to an embodiment.

FIG. 6 illustrates an unbalance control 600. Here, a control system will be defined that acts to compensate for the −ve sequence, or unbalance in the 3 phase loads due to, for example, the presence of single phase loads on the islanded system. This is shown in FIG. 6, note the GridVac* and VacRef−ve will both need to be clamped based on the available current, in a similar way as shown in FIG. 3. 600 could actually replace 399. 600 has an additional input to control the negative sequence voltage on an islanded grid. As can be seen in FIG. 6, GridVac*neg and GridVac* are input signals and are processed in order to eliminate the negative sequence in the actual AC voltage. This is done on the shown blocks 601-612, where the signals Vac (as feedback signal) and VacRef−ve are combined in order to compensate the −ve sequence. The +ve and −ve seq Vac controllers are decoupled, so they act independently of each other to satisfy their references, VacRef+ve and VacRef−ve.

Block 300 may be splitted in one embodiment in two blocks representing that the positive and negative sequence voltages are controlled to respect the prevailing power and hardware ratings.

Figure 7:
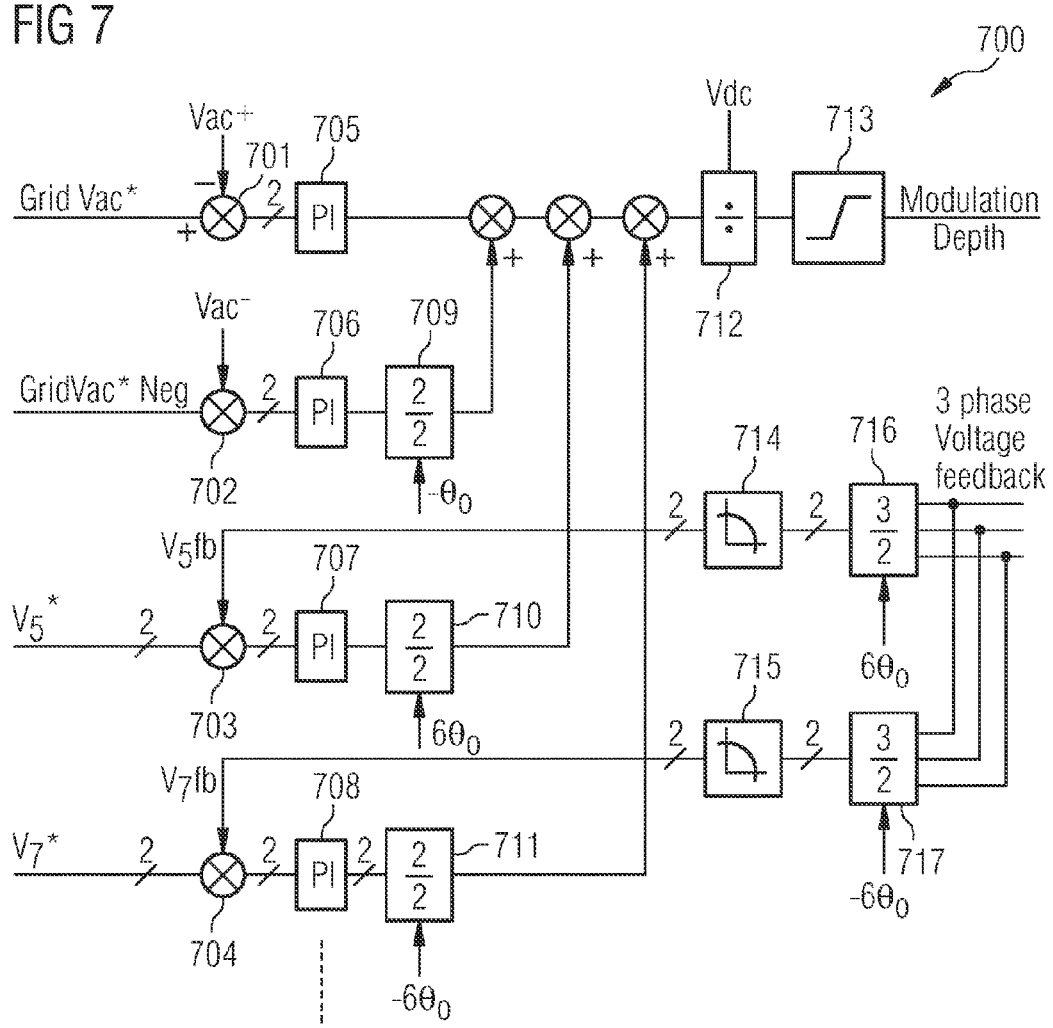
FIG. 7 illustrates a harmonic compensation according to an embodiment.

FIG. 7 illustrates a harmonic compensation scheme 700. Here, a feedback mechanism is defined to attempt to compensate for the harmonic distortion introduced to the islanded network by non-linear loads. The "Voltage Brickwall" concept described above could be considered (in hysteresis mode) to maintain the voltage within a band. However there is also the possibility of implementing this feature via multiple synchronous rotating reference frames, to compensate for the harmonic voltage distortion. Multiple synchronously rotating reference frames at all integer harmonic frequencies, or selective harmonic frequencies can be used, to reduce the harmonic voltage on the LV or MV side of the Park Tx to zero. Again the reference voltages must be clamped to respect the current rating of the converter in a similar way to that shown in FIG. 3. The PI controllers (705-708) could be replaced by proportional resonant controllers for example. In this case, also 714 and 715 might be removed or modified. As can be seen, different input signals, i.e., harmonics of the voltage, are processed (703, 707, 710, 714, 716 for the fifth harmonic in this example and 704, 708, 711, 715, 717 for the seventh harmonic) and added to processed (701, 705) Vac Ref to which VacRef−ve has been added before after some processing steps (702, 706, 709). The result is forwarded to a divider 712 and, after a filter step 713, output as modulation depth. In this scheme it is intended that the Wind Park controller, would send the voltage references to the turbines.

This control scheme could also be extended to harmonics other than just the 5$^{th}$ and 7$^{th}$ harmonic as it is shown in FIG. 7.

Figure 8:
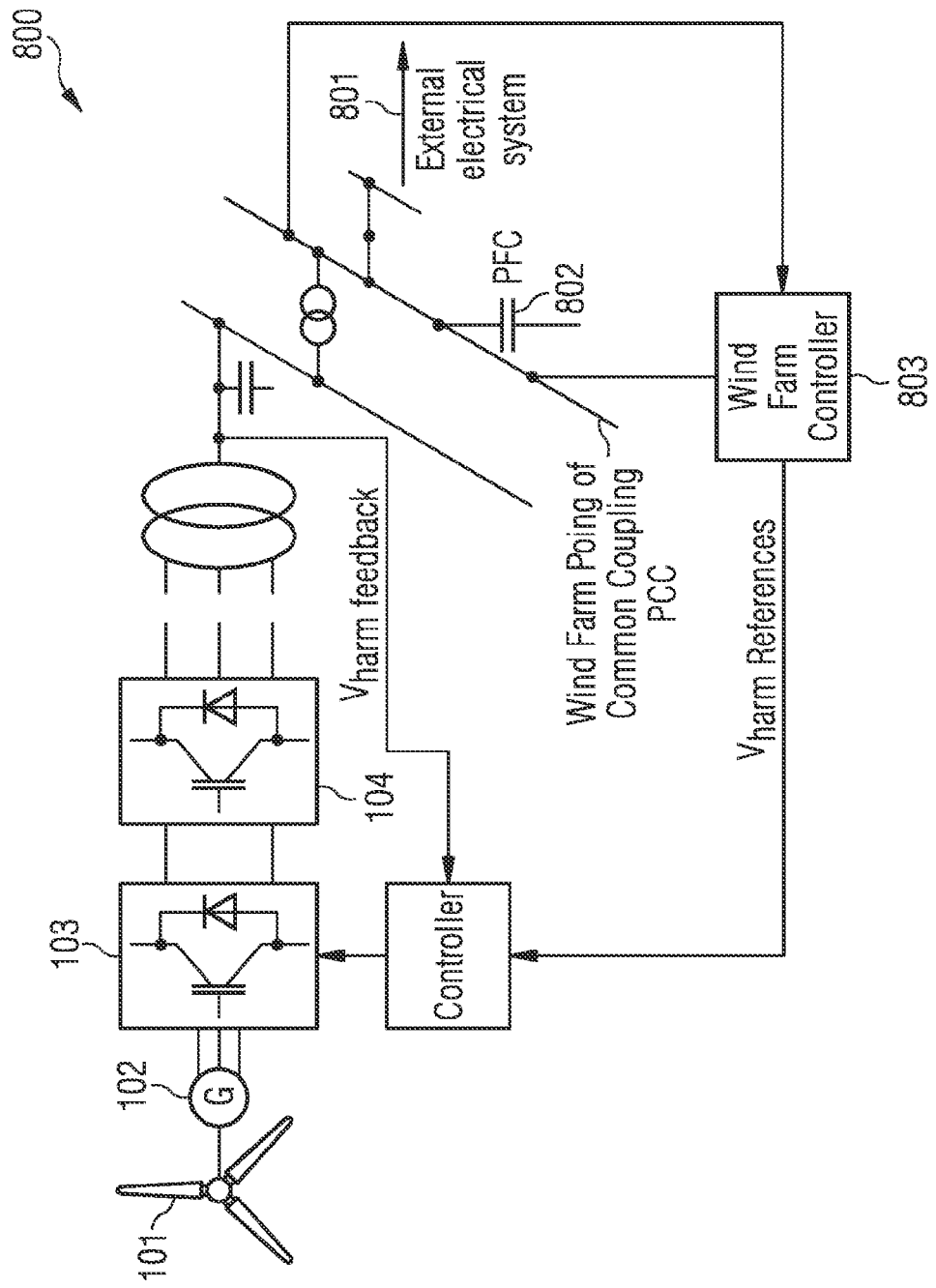
FIG. 8 illustrates an AC system resonance damping according to an embodiment.

FIG. 8 illustrates a system 800 for resonance damping. Here, electrical system resonances could be damped on the islanded electrical system. If the voltage feedback from a more remote bus is available or its frequency spectra calculated in real time then, then control of the harmonic (and/or inter-harmonic) voltages caused by local non-linear loads (present on 801), or resonances within the islanded system 802 could be feedback to the Network bridge to modulate a PWM voltage containing the correct harmonic spectra to damp the not so local harmonic voltages. Note the wind farm controller 803 could possibly compute the harmonic voltage references and pass these back to the turbine, rather than passing the (probably higher bandwidth) signal of the Vac feedback back to the turbine for the turbine control to calculate the required compensation voltages. Having the high data rate calculations done at the wind farm controller may be better than trying to pass high data rate voltage feedback back to the turbine.

Figure 9:
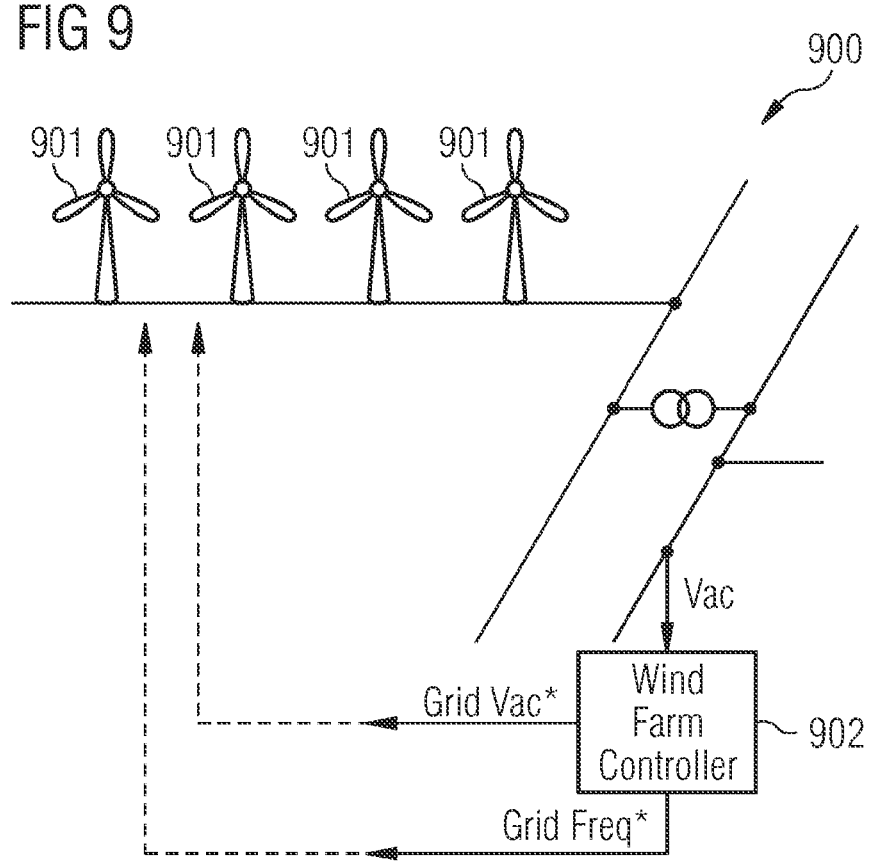
FIGS. 9 and 10 illustrate a droop control within a wind turbine.
Figure 10:
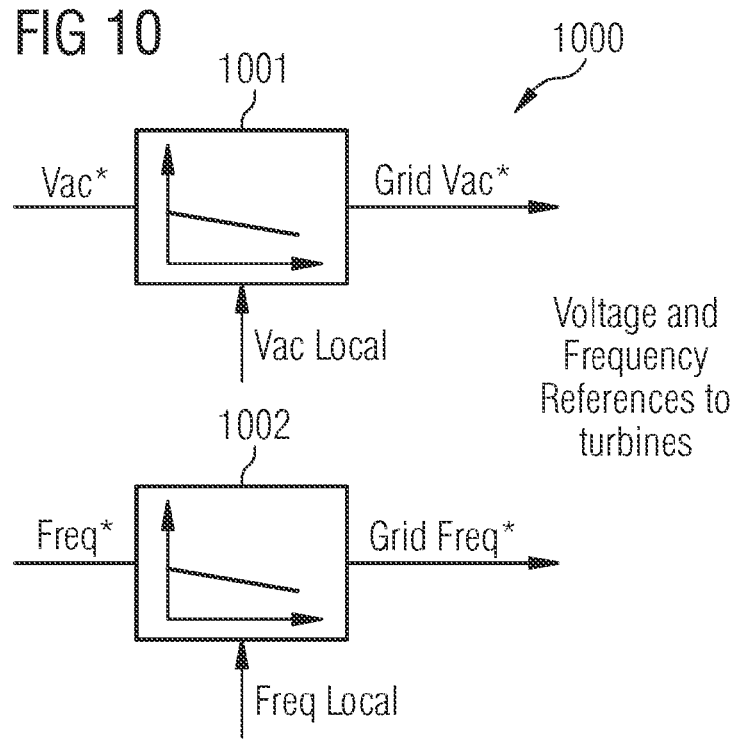

FIGS. 9 and 10 show a droop control 900, 1000 within wind turbines 901 defining a method by which multiple wind turbines on an islanded electrical system act in such a way as to share the load and/or reactive power requirements of the islanded system. Multiple turbines within a farm can share the load and reactive power requirements between them by having a droop characteristic 1001, 1002 between them on the VacRef and Freq ref received from the wind park or farm controller 902.

Extension of the above to islanded HVDC systems may be possible, whereby in the event that the remote (or offshore) power bridge of a HVDC connected windfarm becomes blocked, the wind turbines act in such a way to maintain voltage and frequency on the blocked HVDC busbar. All the above control proposals are relevant for offshore HVDC connected Wind Farms. In the event that 1 of N HVDC schemes within a farm trip or are blocked then the wind turbines on the offshore system need to try and maintain the voltage and frequencies, hence the above mentioned techniques may apply. In addition there may potentially also be requirements to rapidly reduce the power generated by the wind turbines to respect the power transfer capability of the remaining N−1 HVDC systems transferring power from the offshore AC system into the DC link of the HVDC scheme.

During a highly dynamic event such as a HVDC converter 'block' the frequency, and voltage, of the offshore network will deviate significantly, hence the local turbine voltage and frequency references need to respond quickly. This is the purpose of the PI (or could just be proportional or other control) blocks in FIG. 3. The clamp based on Iq and Id to the left hand side of FIG. 3 are to define the steady state local Vac and Freq references to respect the prevailing power and the converter current rating. In the event of a highly dynamic event the PI controls respond by modifying the local freq and/or voltage limits, but again these control actions are limited by the available power and current rating, hence the clamp blocks to the right hand side of FIG. 3. In addition, there is a coupling, or fast power feedforward to the generator bridge, this is shown as an output on FIG. 3.

The generator bridge control 1100 is shown in FIG. 11, wherein the power feedforward is an input. This signal acts to shut down the power quickly, to help regulate the DC link voltage when there is a transient increase in the grid frequency (which may be the case during an HVDC blocking event). Similarly if the frequency suddenly drops the network bridge will attempt to increase the frequency (subject to current and power limits) and hence the generator needs to deliver more power from the generator into the DC link. It is clear here that some priority needs to be allocated on the network bridge to where the available current rating is allocated, on the reactive power axis (for Vac support) or for frequency support (defined by the prevailing power limit), when the network bridge is running close to current limit.

In the generator bridge control 1100, Vdc* as input is multiplied with a wind turbine generator signal, adjusted by a shaft damping 1101. After a PI controller 1102 and a multiplication 1103 with Vdc, the signal is multiplied with the power feedforward, adjusted 1105 by the power limit. After these processing steps, the signal is processed with a torque limit x speed signal for generating the generator power*. Anti-windup could be added to the PI integrator from the Torque*Speed clamp.

The herein described control system has been considered for a fixed switching frequency 2 level power converter. The control system would equally be applicable to multi level power converters, or variable switching frequency hysteresis or sliding mode based control schemes.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A controller for controlling a power converter for a wind turbine, the power converter for converting an electrical input power of the wind turbine into an electrical output power, wherein the electrical output power is provided to a grid,
wherein the power converter comprises a grid-side converter part and a turbine-side converter part,
the controller comprising
an input terminal for receiving a voltage reference signal being associated with a predefined grid voltage and a frequency reference signal being associated with a predefined grid frequency, and
a network bridge controller being adapted to control the power conversion of the grid-side converter part,
wherein the network bridge controller comprises a modulator for modulating gate drive command signals in the grid-side converter part based on a reference voltage and a reference angle being derived from the voltage reference signal and the frequency reference signal,
wherein the modulator is adapted to modulate the gate drive command signals in order to maintain the predefined grid voltage and the predefined grid frequency in the power converter in the case of a failure within the grid.

2. The controller as set forth in claim 1, wherein the predefined grid voltage and/or predefined grid frequency are a desired and/or required grid voltage and/or grid frequency.

3. The controller as set forth in claim 1, wherein the controller is further adapted to receive a wind turbine power signal being representative for the available power from the wind turbine, and wherein the network bridge controller is adapted to modulate the gate drive command signals based on the wind turbine power signal.

4. The controller as set forth in claim 3, wherein the network bridge controller is adapted to adjust the reference voltage and reference angle based on the wind turbine power signal.

5. The controller as set forth in claim 1, wherein the controller is further adapted to receive a current rating signal being representative for the current rating from the wind turbine and/or power converter, and wherein the network bridge controller is adapted to modulate the gate drive command signals based on the current rating signal.

6. The controller as set forth in claim 5, wherein the network bridge controller is adapted to adjust the reference voltage and reference angle based on the current rating signal.

7. The controller as set forth in claim 1, wherein the voltage reference signal and the frequency reference signal are received from a wind park controller, or an external source.

8. The controller as set forth in claim 1, further comprising a compensation unit being adapted to compensate harmonic distortions being provided to the utility grid.

9. The controller as set forth in claim 1, further comprising a resonance damping unit being adapted to reduce resonances of the utility grid.

10. The controller as set forth in claim 1, wherein the network bridge controller is further adapted for performing fast control of power.

11. The controller as set forth in claim 1, further comprising a control unit being adapted to control the connected turbines to share the power and reactive power load on the islanded system.

12. The controller as set forth in claim 1, further comprising a re-synchronisation unit being adapted to re-synchronise the turbines when the failure within the grid ends.

13. A power generation system, the power generation system comprising
a power supply unit,
a power converter for converting an input power signal from the power supply unit into an output power signal, and
the controller for controlling the power converter as set forth in claim 1.

14. The power generation system of claim 13, wherein the power generation system comprises a wind turbine system for supplying electrical power to a utility grid and the power supply unit comprises a generator.

15. A method for controlling a power converter for a wind turbine, the power converter for converting an electrical input power of the wind turbine into an electrical output power, wherein the electrical output power is provided to a grid, wherein the power converter comprises a grid-side converter part and a turbine-side converter part,
the method comprising
receiving a voltage reference signal being associated with a predefined grid voltage and a frequency reference signal being associated with a predefined grid frequency, and
controlling the power conversion of the grid-side converter part by
modulating gate drive command signals in the grid-side converter part based on a reference voltage and a reference angle being derived from the voltage reference signal and the frequency reference signal, and
modulating the gate drive command signals in order to maintain the predefined grid voltage and the predefined grid frequency in the power converter in the case of a failure within the grid.

16. A computer program embodied on a non-transitory computer readable medium for controlling a power converter for a wind turbine, the computer program, when being executed by a data processor, is adapted for controlling the method as set forth in claim 15.

* * * * *